United States Patent [19]
Jones

[11] Patent Number: 5,098,114
[45] Date of Patent: Mar. 24, 1992

[54] PIVOTLESS HUMAN-POWERED VEHICLE SUSPENSION SYSTEM

[76] Inventor: Gwyndaf M. Jones, 78 Estabrook Rd., Carlisle, Mass. 01741

[21] Appl. No.: 584,187

[22] Filed: Sep. 18, 1990

[51] Int. Cl.⁵ .............................................. B62K 3/00
[52] U.S. Cl. .................................................... 280/284
[58] Field of Search ............ 280/284, 283, 286, 281.1, 280/711, 288, 285, 275; 267/64.27; 180/227

[56] References Cited

U.S. PATENT DOCUMENTS

| | | | |
|---|---|---|---|
| 2,283,671 | 5/1942 | Finlay et al. | 280/284 |
| 3,907,332 | 9/1975 | Richardson | 280/285 |
| 3,966,230 | 6/1976 | Nicol | 280/281.1 |
| 4,059,168 | 11/1977 | House | 180/1 P |
| 4,153,266 | 5/1979 | Uhls | 280/276 |
| 4,186,936 | 2/1980 | Offenstadt et al. | 280/277 |
| 4,456,277 | 6/1984 | Carpenter | 280/282 |
| 4,500,103 | 2/1985 | Klein | 280/281 |
| 4,582,343 | 4/1986 | Waugh | 280/284 |
| 4,600,449 | 7/1986 | White et al. | 148/407 |
| 4,621,827 | 11/1986 | Klein | 280/281 |
| 4,679,811 | 7/1987 | Shuler | 280/284 |
| 4,708,356 | 11/1987 | Levavi | 280/255 |
| 4,741,517 | 5/1988 | Warmuth et al. | 267/64.27 |
| 4,786,035 | 11/1988 | Elliott | 267/64.27 |
| 4,789,174 | 12/1988 | Lawwill | 280/284 |
| 4,815,763 | 3/1989 | Hartmann | 280/276 |
| 4,834,408 | 5/1989 | deCortanze | 280/96.1 |
| 4,875,699 | 10/1989 | Levavi | 280/236 |
| 4,877,102 | 10/1989 | Stewart | 180/217 |
| 4,881,750 | 11/1989 | Hartmann | 280/276 |

FOREIGN PATENT DOCUMENTS 3445308  7/1986  Fed. Rep. of Germany ... 280/281.1

OTHER PUBLICATIONS

French Magazine: "Velo Vert", Aug.–Sep. 1990, pp. 26–27, not translated.

*Primary Examiner*—Charles A. Marmor
*Assistant Examiner*—Paul Dickson
*Attorney, Agent, or Firm*—Weingarten, Schurgin, Gagnebin & Hayes

[57] ABSTRACT

A pivotless suspension system for a bicycle comprising a shock absorber integral to the frame and an inherently resilient structural member to assist in the suspension system. An adjustable air spring is mounted integral to a seat stay and comprises means for selectably pumping and venting the air spring to increase or decrease ride stiffness. A titanium frame embodiment comprises either a standard or elevated resilient chainstay which acts as the resilient structural member and assists the air spring in the suspension system. A bump driven pump for the air spring; handle bar control of pumping and venting; and a locking means for effectively nullifying the suspension can be provided.

23 Claims, 3 Drawing Sheets

PIVOTLESS HUMAN-POWERED VEHICLE SUSPENSION SYSTEM

FIELD OF THE INVENTION

The present invention relates to a suspension system which may be employed for a bicycle, tricycle, wheelchair or other human-powered vehicle.

BACKGROUND OF THE INVENTION

Increased interest in long distance bicycling and bicycling over rugged terrain have brought about several attempts to reduce the rigors of such bicycling by providing a suspension system integral to the bicycle frame. A fundamental problem of providing significant additional comfort via a suspension system, is the addition of significant additional weight and the loss of efficiency. Additional weight is undesirable in the context of human-powered vehicles.

Lawwill U.S. Pat. No. 4,789,174 illustrates a bicycle having a suspension system which comprises an elaborate multi-pivoted interconnection of swing arms, control arms and hub plates configured in a trapezoidal arrangement and connected to a bicycle seat riser tube. The multi-pivoted trapezoidal configuration facilitates the application of balanced forces to the rear wheel from the chain during pedaling. A shock absorber connected to the swing arms in the trapezoidal configuration absorbs shocks during riding. The Lawwill suspension system however, because of the elaborate trapezoidal arrangement and the numerous pivot points and associated hardware required for implementation, adds significant weight to the bicycle frame.

A bicycle rear wheel suspension system having a shock absorber mounted coaxially inside a top frame tube is disclosed in Shuler U.S. Pat. No. 4,679,811. The shock absorber is anchored at one end to a double pivoted swing arm rear wheel mount. On-demand mode selection provides selection of a rigid/nonsuspension rear wheel or a spring/suspension rear wheel by means of a remote actuated cylinder disposed inside the shock absorber. The double pivot and the actuated cylinder mode selectable shock absorber, add significant undesirable weight in this implementation.

Other bicycle frame suspension systems incorporating shock absorbers are known in the art, such as the frame illustrated in FIG. 1. Such a frame avoids the elaborate configurations taught in Lawwill and Shuler, and the associated additional weight. The frame of FIG. 1 is typically made from tubing of aluminum or chromium molybdenum steel alloy, for light weight, and has a triangular configuration 10 comprising an elevated chainstay 12 pivotably mounted to the seat riser tube 14. The triangular configuration 10 is further connected to the seat riser tube 14 by a shock absorber 16. Such a configuration relies on a pivot 18 and the resiliency of the shock absorber 16, to provide suitable suspension and to maximize energy transfer, by the chain, to the rear wheel during pedaling. This prior art configuration, although implemented in lightweight tubing for weight considerations, has the integral pivot 18 which must be big and heavy to withstand the significant forces exerted upon it. Such a pivot adds considerable complexity to frame construction, has negligible resiliency to aid in shock absorbtion and also adds significant additional weight. Further, because the triangular member pivots freely, but for the constraint of the shock absorber, the shock absorber alone facilitates the resiliency of the triangular member. As the shock absorber is the only resilient component in this suspension system, it is required to be larger and heavier to withstand extended use.

SUMMARY OF THE INVENTION

According to the present invention a lightweight bicycle frame is provided having a pivotless suspension system which comprises a shock absorber integral to the frame and an inherently resilient structural member to assist in the suspension system.

An adjustable air spring is mounted integral to a seat stay and comprises means for selectably pumping and venting the air spring to increase or decrease shock stiffness.

A titanium frame embodiment is disclosed comprising either a standard or elevated resilient chainstay acting as the resilient structural member, assisting the air spring in the suspension system. A bump driven pump for the air spring, handlebar control of pumping and venting, and a locking means for effectively nullifying the suspension are provided.

BRIEF DESCRIPTION OF THE DRAWING

These and other features and advantages of the present invention will become more apparent in light of the following detailed description of an illustrative embodiment thereof, as illustrated in the accompanying drawings, of which.

DETAILED DESCRIPTION

Figure 1:
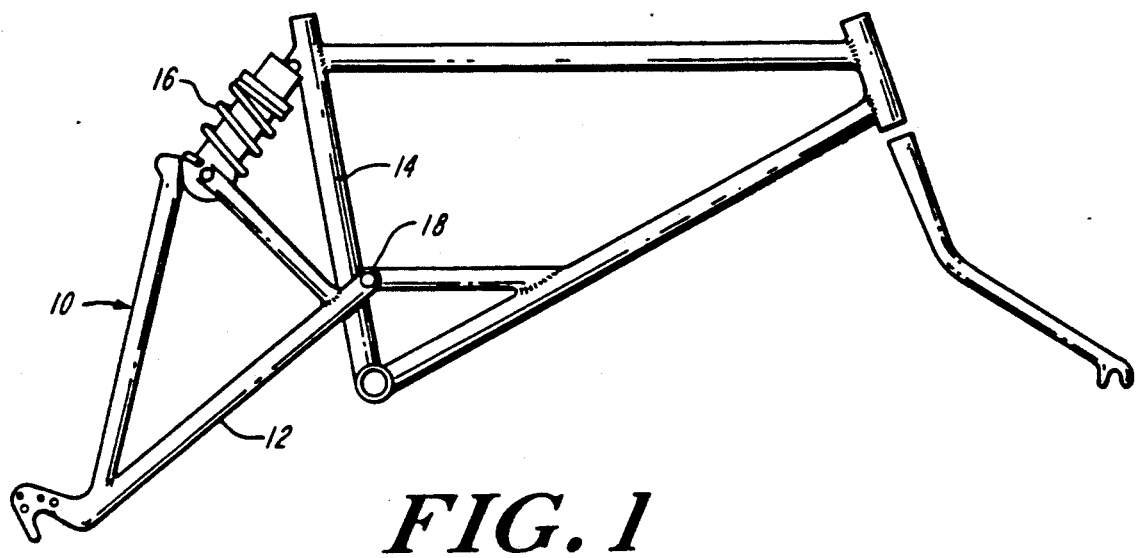
FIG. 1 is a prior art bicycle suspension system incorporating a pivot.
Figure 2:
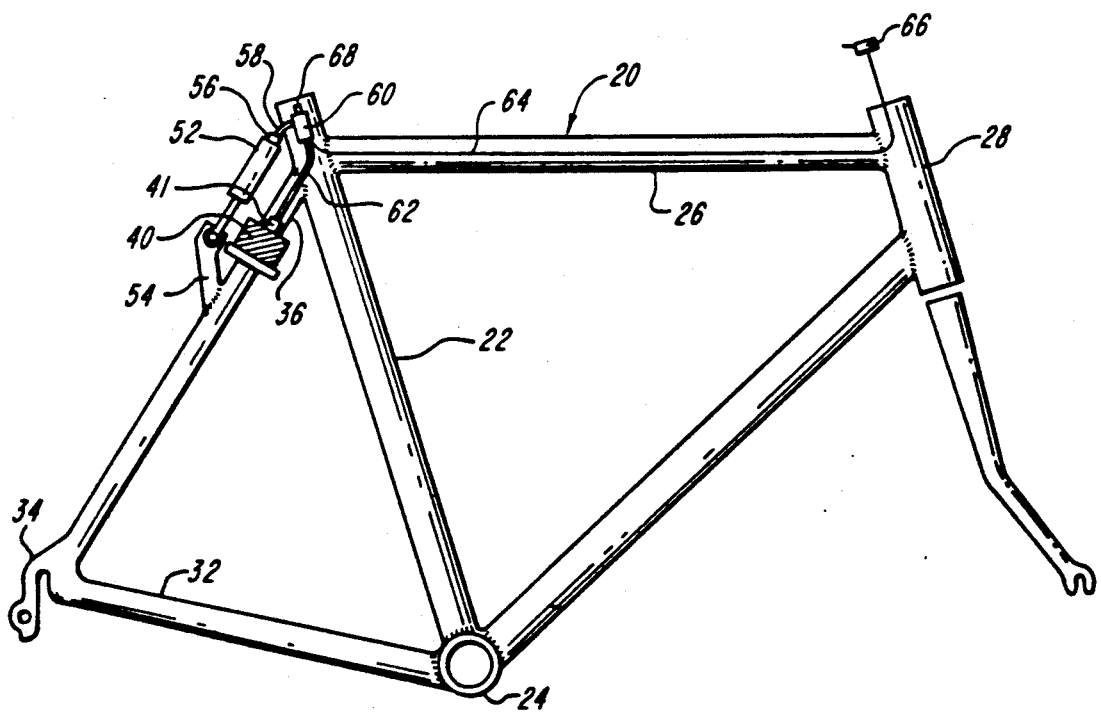
FIG. 2 is a side view of a pivotless bicycle suspension system.

Referring now to FIG. 2, one embodiment of a bicycle suspension system according to the invention is preferably implemented as a tubular frame 20 constructed of titanium alloy, Ti 3-2.5, comprising 3% aluminum and 2.5% vanadium. This titanium alloy has a high strength-to-weight ratio and because of its weldability it is suitable for the construction of bicycle frames using seamless tubing. In addition to its weldability, such titanium has the desirable characteristics of great fatigue life, corrosion resistance and most importantly, resilience.

Figure 2A:
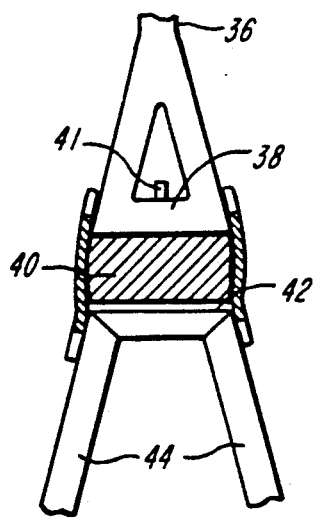
FIG. 2A is a rear view of an integral shock absorber and seatstay mount.

The frame 20 comprises a seat riser tube 22 having a bottom bracket housing 24 at a bottom end. A toptube 26 is welded near the top of the seat riser tube 22 and is welded at an opposing end to a front fork pivot tube 28. A downtube 30 is welded at one end to the front fork pivot tube 28 and at a second end to the bottom bracket housing 24. A pair of chainstays 32 are welded to the bottom bracket housing 24, each one having a wheel mount, such as a dropout 34 fixed at the opposite end thereof. A seatstay 36 is welded to the seat riser tube 22 near the top and as illustrated in FIG. 2A is furcated and has a mounting portion 38. A top portion of an air spring 40 is connected to the mounting portion 38 of the seatstay 36. The mounting portion 38 has a void therethrough to accommodate an air valve 41 for inflating the air spring 40. A second mounting portion 42 of a furcated lower section 44 of the seatstay 36 is attached to a bottom portion of the air spring 40. Each tube of the furcated lower section 44 of the seatstay 36 is welded to a respective dropout 34.

Figure 3:
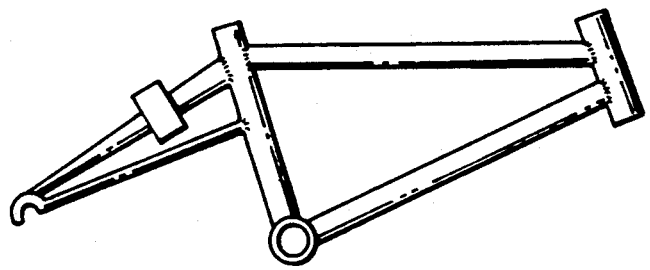
FIG. 3 is a side view of a pivotless bicycle suspension system, embodied in a frame having an elevated chainstay.

The air spring 40 facilitates rear wheel motion, especially in a plane perpendicular to the riding surface and has sufficient wall strength which tends to preclude significant lateral motion. Assisting the air spring 40 in the suspension system is a resilient structural member, in this case the pair of chainstays 32. The inherent flex capability of the chainstays 32 further facilitates suspension travel of the rear wheel, supplementing the function of a main spring provided in the form of air spring 40. In the suspension system according to the invention, the inherent flex of the chainstays effects the function of a pivot, i.e. permitting motion in one or more planes while limiting motion in one or more others, while avoiding the weight and complexity of a pivot. While the illustrative embodiment of FIG. 2 shows a suspension system according to the invention in the context of a frame having a standard chainstay, the same could be implemented in an elevated chainstay configuration as illustrated in FIG. 3.

Preferably, the resilient structural member, i.e. the chainstays, are fabricated as indicated hereinabove using Ti 3-2.5. The chainstays are about 0.750 inches in diameter and constructed using tubing having a wall thickness of about 0.039 inches. It is desirable to construct each of the forks of the lower furcated section 44 of the seatstay 36 using the same material and dimensions. By adjusting air pressure in the air spring 40 via air valve 41, and by introducing a travel stop, the overall travel at the rear wheel can vary in a range from about 0.250 inches to about 3.0 inches.

Figure 2B:
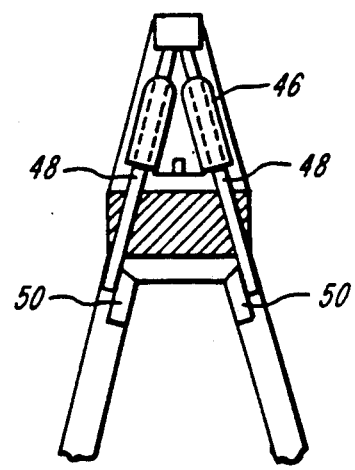
FIG. 2B is a rear view of the integral shock absorber of FIG. 2A having cylinders mounted for an hydraulic dampener.

As illustrated in FIG. 2B the frame 20 according to the invention may be provided with one or more dampener cylinders 46. The dampener cylinders are hydraulic cylinders as known in the art, which provide additional suspension assist and act as travel stops to limit the wheel travel to within the limits discussed hereinabove. The cylinders have posts 48 which are attached to each tube of the lower furcated section 44 of seatstay 36. Reinforcements 50 may be provided to preserve the integrity of the tubes of the lower furcate section 44. As the dampener cylinders may not be necessary in the suspension system according to the invention and as they may provide added undesirable weight, a simple travel limiting strap, as illustrated in FIG. 2A, which can be manually adjusted, may be desirable.

Figure 2C:
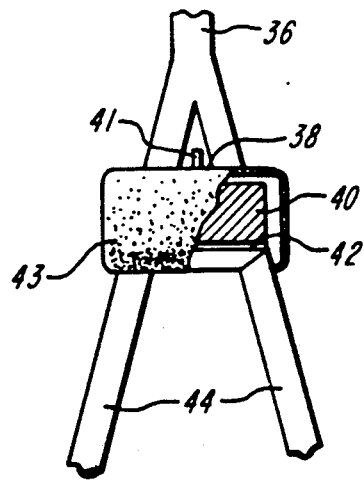
FIG. 2C is a rear view of the integral shock absorber of FIG. 2A having an enclosing flexible tube.

Alternatively, as shown in FIG. 2C, the air spring 40 may be enclosed in a flexible tube or sock 43. Such an enclosure is constructed of flexibly compressable material which is inelastic so as to not stretch, therefore, the sock 43 may act as a travel limit. Additionally, the sock 43 provides a relatively clean and dry enclosure for air spring 40 or other shock absorber.

Referring now to FIG. 2, the suspension system is provided with a bump actuated pump 52 which will inflate the air spring 40, via valve 41, in lieu of manual inflation. The pump 52, a standard air pump known in the art, is mounted via pump mount 54 to the second mounting portion 42 of the furcated lower section 44 of the seatstay 36 or to a removable crossmount attached to the furcated lower section 44. A top pump mount 56 is mechanically fastened to the seat riser tube 22, such as by a weld or removable clamp, above the seatstay tube 36. The top pump mount accommodates a pump air escape 58 through which air is pumped. The air escape 58 from the pump goes into a control box 60 which may be mounted in or on the seat riser tube 22. The control box 60 effects three modes of air spring operation: pump, hold and vent, by effecting a valve switching mechanism. An air line 62 extends from the control box 60 to the valve 41 of air spring 40. A control cable 64 runs from the control box 60 to a control switch 66 mounted proximate to handlebars mounted in the front fork pivot tube 28.

When the frame, in use, is jarred so that chainstays 32 are deflected and air spring 40 periodically compresses, the pump 52 alternately expands and compresses, driving air out of air escape 58. The air from air escape 58 enters control box 60 which maintains the air spring 40 in one of three modes; i.e. pump, hold or vent, depending on the condition of cable 64 as affected by control switch 66.

When the control box 60 is in the pump mode, the reciprocating motion of the pump 52 causes air to exit the air escape 58 and travel to the air spring 40 through air line 62, resulting in inflation or increased air pressure within the air spring 40. The pressure within the air spring may be maintained at a desired level by switching the control box into the hold mode, which causes the sealing of air line 62 and release of air from the air escape 58 to the atmosphere via a vent line 68. Air may be released or vented from the air spring 40, effectively softening the suspension system, by switching the control box 60 to the vent mode, in which air is vented from the air spring 40 through the vent line 68.

Figure 4:
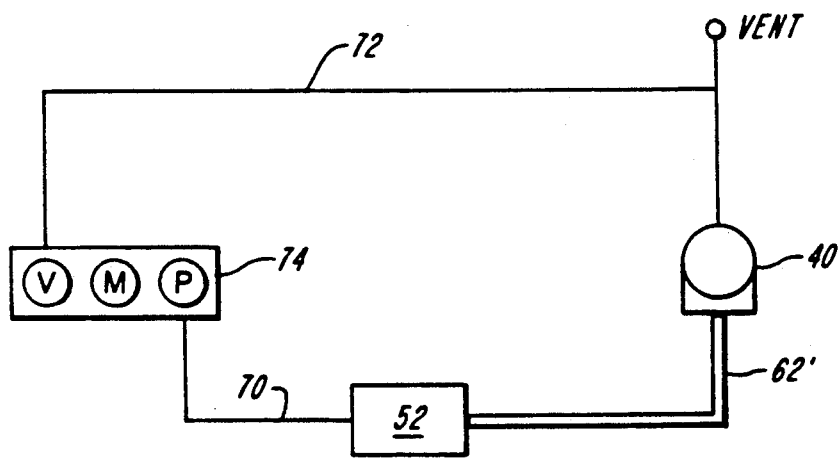
FIG. 4 is a schematic diagram of an air spring pumping and venting system for the bicycle suspension system.

Alternatively, mode selection may be implemented as illustrated in the schematic of FIG. 4. In such an embodiment a pair of cables 70, 72 run from a handlebar-mounted switch 74. One cable 70 runs to the pump 52 and activates it so that reciprocating motion causes air to pump through air line 62 to the air spring 40 increasing the air pressure therein. The second cable 72 runs to, and activates, a vent attached to air spring 40 enabling air to be vented therefrom. The handlebar-mounted switch or control means 74, which can be a lever or pushbutton switch, has a third mode, hold, which effectively disables the pump and vent functions, such that the air present in the air spring 40 is retained.

The suspension system discussed hereinabove may be nullified by locking the travel limit mechanism, whether strap or hydraulic cylinder as discussed hereinabove, so as to preclude the reciprocating motion of the air spring 40. In such a mode the flex inherent in the titanium structural members would provide the only shock absorbtion.

Although an air spring is described in the suspension system according to the invention it may be appreciated that a standard shock absorber could provide the main spring function which is supplemented by the resiliency of the titanium structural member.

While the resilient structural member according to the invention is described as a pair of chainstays, it can be appreciated by one of ordinary skill in the art that another structural member could be provided with the resiliency to supplement the main spring function of the air spring or other shock absorber.

Although in the preferred embodiment a resilient structural member in the form of a titanium tubular chainstay of a particular wall thickness and diameter is disclosed, it should be appreciated that the function of supplemental resiliency can be achieved using other materials and configurations for the resilient structural member, such as tubular steel of greater wall thickness and lesser diameter or a flat metal or composite arcuate structure such as a leaf spring, or other suitable resilient structural members.

While the mode select function of the air suspension system according to the invention is described as a cable controlled valve or switching mechanism, one of ordinary skill in the art can appreciate that such a function can be provided otherwise, such as by using electronics.

While the suspension system principles according to the invention are discussed in the context of a bicycle rear wheel suspension, it should be appreciated that this suspension system is similarly applicable in a bicycle front wheel suspension or in other human-powered vehicle suspension systems.

Although the invention has been shown and described with respect to an illustrative embodiment thereof, it will be understood by those of ordinary skill in the art that the foregoing and various other changes, omissions and additions in the form and detail thereof may be made without departing from the spirit and scope of the invention as delineated in the claims.

What is claimed is:

1. A suspension system in a human powered vehicle with a seat riser tube having a top end and a bottom end, said bottom end having a bottom bracket housing portion, said suspension system comprising:
   at least one pivotless resilient structural member having first and second ends and being connected at said first end to said seat riser tube, said at least one pivotless resilient structural member having a wheel mount disposed at said second end, said wheel mount having an equilibrium position and being capable of deflecting from said equilibrium position;
   a seatstay having an upper portion and a lower portion, said upper portion having a first end and a second mount end, said lower portion having a first mount end and a second end;
   said first end of said upper portion being connected to said seat riser tube proximate to said top end of said seat riser tube and said second end of said lower portion being connected to said second end of said pivotless resilient structural member
   a main spring disposed coaxial with said seatstay and having a first side and a second side, said first side of said main spring being connected to said upper portion of said seatstay at said first mount and said second side of said main spring being connected to said lower portion of said seatstay at said second mount;
   a pump mounted to said seatstay and connected to said upper portion and to said lower portion, said pump being actuated upon the compression and expansion of said main spring and said pump being connected to said main spring whereby pressure in said main spring is increased by compression of said pump; and
   wherein compression and expansion of said main spring and deflection of said at least one pivotless resilient structural member permits deflection of said second end of said at least one pivotless resilient structural member.

2. The suspension system of claim 1 wherein said human-powered vehicle is a bicycle comprising a frame constructed of titanium alloy comprising 3% aluminum and 2.5% vanadium.

3. The suspension system of claim 2 wherein said at least one pivotless resilient structural member comprises a pair of chainstays and said first end of each of said pair of chainstays is connected to said seat riser tube at said bottom bracket housing portion.

4. The suspension system of claim 1 wherein said first end of said at least one pivotless resilient structural member is connected to said seat riser tube approximately midway between said top end and said bottom end.

5. The suspension system of claim 2 wherein said wheel mount is a dropout.

6. The suspension system of claim 1 wherein said main spring is an air spring.

7. The suspension system of claim 1 further comprising at least one dampening cylinder mounted coaxial with said seatstay and being connected to said upper portion of said seatstay and to said lower portion of said seatstay.

8. The suspension system of claim 1 wherein said spring is an air main spring, further comprising a control connected to said pump and said air spring, said control selectively effecting pumping of air into said air spring, venting of air out of said air spring and holding of air in said air spring.

9. The suspension system of claim 1 further comprising means for locking said main spring to prohibit expansion and compression of said main spring.

10. The suspension system of claim 1 wherein said second end of said lower portion of said seatstay is connected to said wheel mount.

11. The suspension system of claim 9 wherein said means for locking is a travel limiting strap.

12. The suspension system of claim 9 wherein said means for locking is an enclosing sock.

13. A bicycle frame, comprising:
   a seat riser tube having a first seat tube end and a second seat tube end, said second seat tube end having a bottom bracket housing portion proximate thereto;
   a toptube having a first toptube end and a second toptube end, said second toptube end being connected to said seat riser tube proximate to said first seat tube end;
   a front fork pivot tube attached to said first toptube end, said front fork pivot tube being substantially parallel to said seat riser tube;
   a downtube having a first downtube end and a second downtube end, said first downtube end being attached to said front fork pivot and said second downtube end being attached to said bottom bracket housing;
   a plurality of pivotless resilient structural members each having a first structure end and a second structure end, said first structure end being attached to said bottom bracket housing and said second structure end having a wheel mount attached thereto and being disposed in an equilibrium position, said plurality of pivotless resilient structural members being capable of deflecting said wheel mount from said equilibrium position;

a seatstay, having an upper portion and a lower portion, said upper portion of said seatstay having a first end and a first mount, said first end of said upper portion being connected to said seat riser tube, said lower portion of said seatstay having a second end and a second mount, said second end of said lower portion being connected to said wheel mount;

a main spring coaxial with said seatstay, said main spring having a top and a bottom, said top of said main spring being connected to said first mount of said upper portion of said seatstay and said bottom of said main spring being connected to said second mount of said lower portion of said seatstay;

a pump mounted to said seatstay and connected to said upper portion and to said lower portion, said pump being actuated upon the compression and expansion of said main spring and said pump being connected to said main spring whereby pressure in said main spring is increased by compression of said pump; and wherein compression and expansion of said main spring and deflection of said plurality of pivotless resilient structural members permits deflection of said second end of said plurality of pivotless resilient structural members.

14. The bicycle frame of claim 13 wherein said bicycle frame is constructed of titanium alloy comprising 3% aluminum and 2.5% vanadium.

15. The bicycle frame of claim 13 wherein said plurality of pivotless resilient structural members comprises a pair of chainstays and each of said pair of chainstays is connected to said seat riser tube at said bottom bracket housing portion.

16. The bicycle frame of claim 13 wherein said plurality of pivotless resilient structural members is connected to said seat riser tube approximately midway between said top and said bottom.

17. The bicycle frame of claim 13 wherein said wheel mount is a dropout.

18. The bicycle frame of claim 13 wherein said main spring is an air spring.

19. The bicycle frame of claim 13 further comprising at least one dampening cylinder mounted coaxial with said seatstay and being connected to said upper portion of said seatstay and to said lower portion of said seatstay.

20. The bicycle frame of claim 13 wherein said main spring is an air spring, further comprising a control connected to said pump and said air spring, said control selectively effecting pumping of air into said air spring, venting of air out of said air spring and holding of air in said air spring.

21. The bicycle frame of claim 13 further comprising means for locking said main spring to prohibit expansion and compression of said main spring.

22. The bicycle frame of claim 21 wherein said means for locking is a travel limiting strap.

23. The bicycle frame of claim 21 wherein said means for locking is an enclosing sock.

* * * * *